US008364765B2

(12) United States Patent
Champlin-Scharff et al.

(10) Patent No.: US 8,364,765 B2
(45) Date of Patent: Jan. 29, 2013

(54) PRIORITIZING ELECTRONIC MESSAGES BASED UPON GEOGRAPHICAL LOCATION OF THE RECIPIENT

(75) Inventors: George H. Champlin-Scharff, Reading, MA (US); Heena Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 12/270,474

(22) Filed: Nov. 13, 2008

(65) Prior Publication Data

US 2010/0121925 A1    May 13, 2010

(51) Int. Cl.
    *G06F 15/16*    (2006.01)
(52) U.S. Cl. .......... 709/206; 709/223; 715/759; 379/90; 379/93
(58) Field of Classification Search .................. 709/206, 709/223; 715/758; 379/90, 93
    See application file for complete search history.

(56) References Cited

U.S. PATENT DOCUMENTS

| | | | |
|---|---|---|---|
| 7,272,853 | B2 | 9/2007 | Goodman et al. |
| 7,657,598 | B2 * | 2/2010 | Daniell et al. ................ 709/206 |
| 7,734,697 | B2 * | 6/2010 | Blohm .......................... 709/206 |
| 2004/0177118 | A1 * | 9/2004 | Mason et al. ................. 709/206 |
| 2005/0068167 | A1 * | 3/2005 | Boyer et al. .................. 340/531 |
| 2005/0138552 | A1 * | 6/2005 | Venolia ......................... 715/526 |
| 2005/0159970 | A1 * | 7/2005 | Buyukkokten et al. ........... 705/1 |
| 2005/0262211 | A1 * | 11/2005 | Yamashita .................... 709/206 |
| 2005/0276397 | A1 * | 12/2005 | Hiatt et al. ................. 379/90.01 |
| 2006/0025220 | A1 * | 2/2006 | Macauley et al. ................ 463/42 |
| 2006/0026253 | A1 * | 2/2006 | Kessen et al. ................. 709/207 |
| 2006/0167944 | A1 | 7/2006 | Baker |
| 2007/0043822 | A1 * | 2/2007 | Brumfield .................... 709/207 |
| 2007/0121425 | A1 * | 5/2007 | Eble et al. ........................ 368/21 |
| 2007/0140062 | A1 * | 6/2007 | Punkka ........................... 368/21 |
| 2008/0028031 | A1 * | 1/2008 | Bailey et al. ................... 709/207 |
| 2008/0028032 | A1 * | 1/2008 | Hladik .......................... 709/207 |
| 2008/0082609 | A1 * | 4/2008 | O'Sullivan et al. ............ 709/204 |
| 2009/0030992 | A1 * | 1/2009 | Callanan et al. .............. 709/206 |
| 2009/0049125 | A1 * | 2/2009 | Channabasavaiah ......... 709/204 |
| 2009/0055487 | A1 * | 2/2009 | Moraes et al. ................. 709/206 |

FOREIGN PATENT DOCUMENTS

| | | |
|---|---|---|
| WO | 2004042608 A2 | 5/2004 |
| WO | 2007030897 A1 | 3/2007 |

OTHER PUBLICATIONS

David Harris, Timezone Information for Pegasus Mail for Windows Users, Jul. 2001.*
Pegasus Mail, An Electronic Mail System for Microsoft Windows Systems, User Manual version 4.*
Iachello et al., "Developing Privacy Guidelines for Social Location Disclosure Applications and Services", Symposium on Usable Privacy Security (SOUPS) 2005, Pittsburgh, PA, Jul. 6-8, 2005, pp. 65-75.
Lemmela et al., "Finding Communication Hot Spots of Location-Based Postings", CHI 2007, Apr. 28-May 3, 2007, San Jose, California, USA, ACM 978-1-59593-642-4/07/0004.

* cited by examiner

*Primary Examiner* — Thuong Nguyen

(74) *Attorney, Agent, or Firm* — Cuenot, Forsythe & Kim, LLC

(57) ABSTRACT

A computer-implemented method of sorting electronic messages can include, for each of a plurality of electronic messages received in an electronic messaging client, determining availability of a sender of each electronic message and determining an order for the electronic messages within the electronic messaging client according to availability of the sender of each electronic message. The method further can include displaying the electronic messages within a view of the electronic messaging client in the order.

17 Claims, 6 Drawing Sheets

Inbox: John Doe

| | Who | Date | Time | Size | Subject |
|---|---|---|---|---|---|
| [-] | Senders that are available | | | | |
| * | Jane Smith | 08/19/2008 | 11:24 AM | 4,099 | Re: Need status update |
| * | Janet Brooks | 08/19/2008 | 05:42 AM | 5,029 | Re: Estimate for replacement parts |
| | Bob Jenkins | 08/17/2008 | 03:36 PM | 2,224,456 | Need advice on project |
| [-] | Senders available at the end of my workday | | | | |
| | John Simon | 08/19/2008 | 09:22 AM | 544,099 | Have you spoken to Jane? |
| | Zoe Perry | 08/17/2008 | 11:02 AM | 45,788 | Vacation request |
| | Mary Donley | 08/19/2008 | 11:30 AM | 47,458 | Slight problem |
| | Mary Donley | 08/19/2008 | 01:44 PM | 444,365 | Have you seen Tom today? |
| | Mary Donley | 08/19/2008 | 02:50 PM | 6,034 | Problem resolved |
| [-] | Senders that will be available after my workday | | | | |
| | Jason Rodgers | 08/19/2008 | 05:42 AM | 345,788 | Supplies |
| | Steve Sierra | 08/17/2008 | 09:22 AM | 102,788 | Working from home today |

FIG. 2

Inbox: John Doe

| | Who | Date | Time | Size | Subject |
|---|---|---|---|---|---|
| [-] UK | | | | | |
| | Steve Sierra | 08/17/2008 | 09:22 AM | 102,788 | Working from home today |
| [-] US Eastern | | | | | |
| * | Jane Smith | 08/19/2008 | 11:24 AM | 4,099 | Re: Need status update |
| * | Janet Brooks | 08/19/2008 | 05:42 AM | 5,029 | Re: Estimate for replacement parts |
| | Bob Jenkins | 08/17/2008 | 03:36 PM | 2,224,456 | Need advice on project |
| [-] US Mountain | | | | | |
| | John Simon | 08/19/2008 | 09:22 AM | 544,099 | Have you spoken to Jane? |
| [-] US Pacific | | | | | |
| | Zoe Perry | 08/17/2008 | 11:02 AM | 45,788 | Vacation request |
| | Mary Donley | 08/19/2008 | 11:30 AM | 47,458 | Slight problem |
| | Mary Donley | 08/19/2008 | 01:44 PM | 444,365 | Have you seen Tom today? |
| | Mary Donley | 08/19/2008 | 02:50 PM | 6,034 | Problem resolved |
| [-] China | | | | | |
| | Jason Rodgers | 08/19/2008 | 05:42 AM | 345,788 | Supplies |

FIG. 3

| Inbox: John Doe | | | | | |
|---|---|---|---|---|---|
| | Who | Date | Time | Size | Subject |
| [-] US Eastern | | | | | |
| * | Jane Smith | 08/19/2008 | 11:24 AM | 4,099 | Re: Need status update |
| * | Janet Brooks | 08/19/2008 | 05:42 AM | 5,029 | Re: Estimate for replacement parts |
| | Bob Jenkins | 08/17/2008 | 03:36 PM | 2,224,456 | Need advice on project |
| [-] US Mountain | | | | | |
| | John Simon | 08/19/2008 | 09:22 AM | 544,099 | Have you spoken to Jane? |
| [-] US Pacific | | | | | |
| | Zoe Perry | 08/17/2008 | 11:02 AM | 45,788 | Vacation request |
| | Mary Donley | 08/19/2008 | 11:30 AM | 47,458 | Slight problem |
| | Mary Donley | 08/19/2008 | 01:44 PM | 444,365 | Have you seen Tom today? |
| | Mary Donley | 08/19/2008 | 02:50 PM | 6,034 | Problem resolved |
| [-] China | | | | | |
| | Jason Rodgers | 08/19/2008 | 05:42 AM | 345,788 | Supplies |
| [-] UK | | | | | |
| | Steve Sierra | 08/17/2008 | 09:22 AM | 102,788 | Working from home today |

FIG. 4

Inbox: John Doe

| | Who | Date | Time | Size | Subject |
|---|---|---|---|---|---|
| [-] | Users working after hours | | | | |
| | * Jane Smith | 08/19/2008 | 11:24 AM | 4,099 | Re: Need status update |
| | * Janet Brooks | 08/19/2008 | 05:42 AM | 5,029 | Re: Estimate for replacement parts |
| [-] | China | | | | |
| | Jason Rodgers | 08/19/2008 | 05:42 AM | 345,788 | Supplies |
| [-] | UK | | | | |
| | Steve Sierra | 08/17/2008 | 09:22 AM | 102,788 | Working from home today |
| [-] | US Eastern (My timezone) | | | | |
| | Bob Jenkins | 08/17/2008 | 03:36 PM | 2,224,456 | Need advice on project |
| [-] | US Mountain | | | | |
| | John Simon | 08/19/2008 | 09:22 AM | 544,099 | Have you spoken to Jane? |
| [-] | US Pacific | | | | |
| | Zoe Perry | 08/17/2008 | 11:02 AM | 45,788 | Vacation request |
| | Mary Donley | 08/19/2008 | 11:30 AM | 47,458 | Slight problem |
| | Mary Donley | 08/19/2008 | 01:44 PM | 444,365 | Have you seen Tom today? |
| | Mary Donley | 08/19/2008 | 02:50 PM | 6,034 | Problem resolved |

PRIORITIZING ELECTRONIC MESSAGES BASED UPON GEOGRAPHICAL LOCATION OF THE RECIPIENT

BACKGROUND

The embodiments of the present invention relate to electronic messaging systems and, more particularly, to sorting and/or prioritizing electronic messages. Many organizations have become global in nature. Within these global organizations, work groups transcend geographic boundaries. This means that a worker in one part of the world will frequently communicate with a worker in another part of the world. Traditionally, electronic messaging systems such as electronic mail, instant messaging, or the like, have been the vehicle for this sort of communication. As a result, one working within a global organization will routinely receive electronic messages from various users from different parts of the world.

Because of differences in time zone between the recipient of the electronic message and the sender of the electronic message, it may be the case that when the recipient chooses to respond to the received electronic message, the sender is not available. For example, by the time a worker located in the U.S.A. responds to a query, that worker's counterpart in Italy, for example, may have left work and no longer be available. The worker in the U.S.A., by not responding earlier in the day, effectively has lost the opportunity for an actual exchange of information with his or her counterpart in Italy. The worker located in the U.S.A. must send an electronic message in the hopes of receiving a reply the next day.

BRIEF SUMMARY OF THE INVENTION

The embodiments disclosed herein relate to sorting and/or prioritizing electronic messages. One embodiment of the present invention can include a computer-implemented method of sorting electronic messages. The method can include, for each of a plurality of electronic messages received in an electronic messaging client, determining availability of a sender of each electronic message and determining an order for the electronic messages within the electronic messaging client according to availability of the sender of each electronic message. The method further can include displaying the electronic messages within a view of the electronic messaging client in the order.

Another embodiment of the present invention can include a system for sorting electronic messages. The system can include an electronic messaging client that, for each of a plurality of electronic messages received in an electronic messaging client, determines availability of a sender of each electronic message, determines an order for the electronic messages within the electronic messaging client according to availability of the sender of each electronic message, and displays the electronic messages within a view of the electronic messaging client in the order.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 2 is a first pictorial view of an inbox of an email client in accordance with another embodiment of the present invention.

FIG. 3 is a second pictorial view of an inbox of an email client in accordance with another embodiment of the present invention.

FIG. 4 is a third pictorial view of an inbox of an email client in accordance with another embodiment of the present invention.

FIG. 5 is a fourth pictorial view of an inbox of an email client in accordance with another embodiment of the present invention.

DETAILED DESCRIPTION OF THE INVENTION

Figure 1:
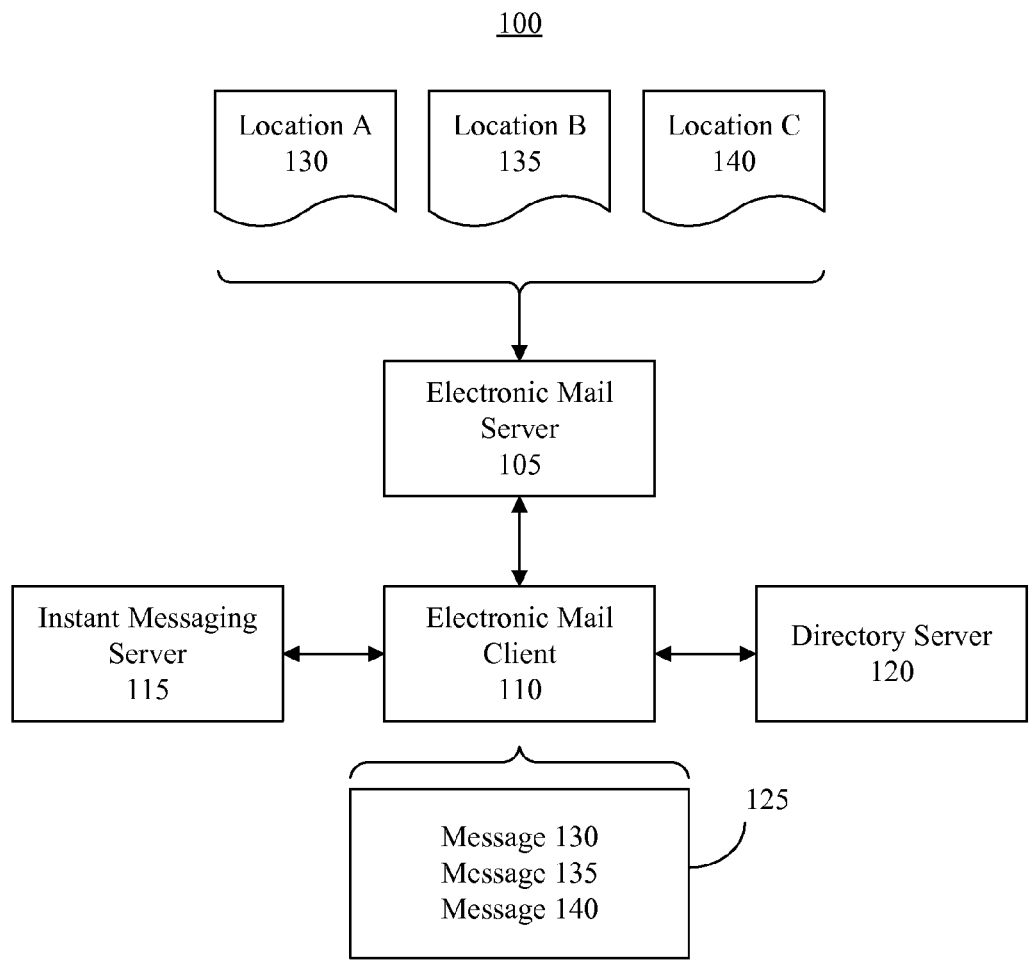
FIG. 1 is a block diagram illustrating a system for automatically determining an order in which to display electronic messages in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to an automated technique for sorting and/or prioritizing electronic messages received within an electronic messaging system. In accordance with the embodiments disclosed herein, electronic messages (hereafter "messages") received within an electronic messaging system can be sorted, ordered, and/or ranked according to various attributes that are indicative of when the sender is available. For example, attributes relating to the location of the sender, the time of day at the location of the sender, and other characteristics can be used to order or sort messages received within the electronic messaging system. By organizing messages in this manner, a user can more easily determine an order in which to respond to the messages. The order will help to ensure that any "follow-up" action taken by the recipient of a message will take place at a time when the sender of the message is also available.

As used herein, a "message" can refer to an electronic mail (email) message, an instant message, a text message, or any other message that may be electronically communicated. Accordingly, throughout this specification, by way of example, reference will be made to electronic mail (email) type messages. It should be appreciated, however, that the embodiments disclosed within this specification can be applied to, or used with, any of a variety of different electronic messaging systems and/or clients in which a view of received messages is presented. For example, the embodiments can be applied to instant messaging (IM) systems, text messaging systems, email, or the like. As such, the embodiments disclosed within this specification are not restricted to the examples provided or to any one particular type of messaging system.

FIG. 1 is a block diagram illustrating a system 100 for automatically determining an order in which to display messages in accordance with one embodiment of the present invention. System 100 can include an email server 105, an email client 110, an instant messaging (IM) server 115, and a directory server 120. Each of the components mentioned, e.g., email server 105, email client 110, IM server 115, and directory server 120 can be implemented in the form of a computer executing suitable operational software, e.g., program code.

A computer suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

In one aspect, each component may be implemented as a separate computer. In another aspect, two or more components may be combined and implemented within a single computer. In yet another aspect, one or more components may be implemented in the form of a portable computer, e.g., a mobile phone, a personal digital assistant, or the like.

Email server 105 can send and receive email among various users. As shown, email server 105 can receive email 130 from location A, email 135 from location B, and email 140 from location C. In this example, the locations A, B, and C represent the location of the sender of each respective email 130-140. Each of locations A, B, and C may represent a particular geographic region, a particular country, a particular time zone, or the like, or the sender of the email. In this example, each of emails 130-140 have been sent to a particular user, e.g., the user of email client 110.

Email client 110 can display a view 125 which includes a list of emails 130-140. Within conventional email clients, users may choose to sort received or sent emails according to time or the sender identity. While this provides users with some degree of control over the manner in which emails are displayed, it does not aid the user in determining which emails to respond to first or which emails to give priority. Moreover, these sorting techniques do not provide any indication as to availability or likely availability of the sender of each email. In accordance with the inventive arrangements disclosed within this specification, messages 130-140 can be sorted within view 125 according to availability, or likely availability, of the sender of each respective email.

Availability can be determined in a variety of different ways. In general, however, the availability of the sender will be determined with reference to the geographic location of the sender of the email with reference to the geographic location of the recipient of the email. Once the location of the sender is determined, a time differential can be determined. The time differential reflects the time difference between the local time at the location of the recipient, e.g., the location of email client 110, and the local time at the location of each sender of an email received within email client 110. The time differential can be used, at least in part, to determine whether each sender is available. In general, the local time of the user of email client 110 can be translated into the local time of each sender of a message according to the time differential. If the translated local time falls within specified availability hours of the sender, the sender is determined to be available.

In one embodiment, presence of a user within an IM system can used to determine availability. IM server 115, as known, can support real-time, or near real-time, communication between a plurality of users. To do so, IM server 115 maintains a list of registered users that are currently logged into the IM server 115. Such users can be said to have established presence with the IM server 115. In general, users that have established presence on IM server 115 may be considered to be "available." In some cases, IM server 115 can support increased detail and control over whether a user is considered "available." For example, users may manually change their status to "unavailable" despite being logged onto IM server 115. In another example, the state of a user may be automatically changed from "available" to "unavailable" after a particular amount of time in which the user is logged onto IM server 115, but otherwise inactive in terms of sending IMs.

In the example pictured in FIG. 1, IM server 115 and email client 110 can communicate with one another so that availability of any sender of an email received within email client 110 that may be registered with IM server 115 can be obtained from IM server 115 by email client 110. This information can be used to sort or order messages 130-140. While availability information received from IM server 115 can be used in and of itself to determine availability, in another embodiment, availability information from IM server 115 can be used to override predetermined availability time ranges of senders. For example, if it is initially determined that a sender is unavailable according to the sender's specified availability time range when compared with the translated local time of the recipient of the message, but the sender has established presence and is available according to IM server 115, that sender may be determined to be available despite the specified availability time range indicating that the sender is unavailable.

In another embodiment, availability information can be determined from directory server 120. Directory server 120 can store location information for users, e.g., senders of emails. Directory server 120, for example, can be implemented as a Lightweight Directory Access Protocol server that stores user profiles for registered users, e.g., employees of a company. In that case, email client 110 can query directory server 120 for location information for any senders of emails received by email client 110. The location information stored within directory server 120 can include, but is not limited to, geographic area, e.g., country, time zone, or the like. Using the location information retrieved from directory server 120, email client 110 can sort or order emails.

For example, email client 110 can determine a time differential between the local time of the sender of an email and the local time of the recipient of the email, e.g., the user of email client 110. The local time of the recipient can be translated into local time for the sender using the time differential, e.g., by adding the time differential to the local time of the recipient. If the local time is within the availability time range of the sender, the sender is available. If not, the sender is not available. It should be appreciated that the availability time range also may be adjusted by the time differential, e.g., translated into the local time of the recipient and compared with the current local time of the recipient. In either case, a determination is made as to whether the sender is available at the current local time of the recipient given the availability time range(s) of the sender and the time differential between the sender and the recipient.

The availability time range for users may be stored within directory server 120 or within email client 110 and/or email server 105. The availability time range for each user, e.g., sender, can be edited or specified by each respective user. Each user may specify a custom availability time range or ranges for each day. Users also may accept default availability times such as 9:00 a.m. to 5:00 p.m., e.g., a default work day.

In another embodiment, availability information can be determined according to geographical markers or indicators that may be found within the communication address of each sender, e.g., within the email address. For instance, a country code that is located within the email address of each user may serve as an indicatory of availability for that user. Given a particular country as the location of a user specified within directory server 120, an availability time period can be ascertained that roughly approximates an eight hour work day in that time zone, for example.

In illustration, detecting the identifier "us" within an email address such as joe.smith@us.ibm.com for a sender of an email can indicate that the sender is located within the U.S.A. By detecting "us" within the email address, a determination can be made that the user will be available during hours that correspond to business hours of each time zone of the U.S.A. Thus, the user may be available from 9:00 a.m. Eastern Standard Time (EST) to 5:00 p.m. Pacific Standard Time (PST). This is but one example. Other examples may include averaging the starting and ending work day times of each respective time zone of a country and using those starting and ending times as the beginning and ending times of the availability period. In another example, a particular time zone can be selected as a master time zone for the country according to which time zone has the most persons that are members of an organization. If more detailed indicators, e.g., a city, are found within the email address, then the time zone of the city can be selected and used.

Any of a variety of different mechanisms for determining the location of the sender of an email can be used. The embodiments disclosed herein are not intended to be limited to those disclosed. Further, it should be appreciated that while different processing techniques are described as occurring within the email client 110, such processing may also occur within the email server 105.

FIG. 2 is a first pictorial view of the inbox of an email client in accordance with another embodiment of the present invention. Within the inbox, messages from senders have been sorted and displayed according to availability. The inbox of FIG. 2 illustrates an embodiment in which emails are sorted into several different categories, where each category corresponds to a particular state or category of availability.

As shown, the first two users Jane Smith and Janet Brooks are listed with an asterisk (*) to the left of each respective name. These two senders have been determined to be available using an IM system. More particularly, the email client has determined, from an IM system, that these users are available. Due to the known availability of Jane Smith and Janet Brooks, the email from each sender is moved to the top of the inbox. Thus, despite other emails being received more recently than the emails from Jane Smith and Janet Brooks, those emails are not displayed at the top, or first, within the inbox. In this manner, the attention of the user of the inbox, John Doe, is drawn to the two messages sent from senders that are known to be available by virtue of the presence information received from the IM system.

As noted, in addition to maintaining indications for those users that are known to be available via communication with an IM system, additional categories of "Senders that are available," "Senders available at the end of my workday," and "Senders that will be available after my workday." have been added. Beneath the "Senders that are available" heading, the email client displays emails from senders that are known to be available via an IM system, as indicated by the asterisks, as well as users such as Bob Jenkins that have been determined to have availability hours that overlap the availability hours of the user of the email client. More particularly, the email client can determine that the current local time within the email client falls within the availability hours of sender Bob Jenkins, after any translation of time has been performed according to the time differential between the location of John Doe and the location of Bob Jenkins.

Beneath the "Senders available at the end of my workday" heading, the email client displays emails from senders that are not currently available, but will be available later in the day. That is, the senders John Simon, Zoe Perry, and Mary Donley, will be available later in the day for some period of time that overlaps the availability time range of John Doe. For example, John Doe may be located in a city on EST, while the senders listed beneath "Senders available at end of my workday" are located in cities on PST. Presuming that each has a standard availability time range of 9:00 a.m. to 5:00 p.m., the senders will have a period of time in which the availability of each user on PST overlaps with the availability of John Doe on EST.

Beneath the "Senders that will be available after my workday" heading, the email client displays emails from senders that are not currently available and that will not be available at any time that overlaps with the availability time range of John Doe. For example, users listed within this heading may be located in other countries such as China, where the availability time range of those users, again presuming availability of a standard work day, does not overlap with the availability time range of the John Doe.

As noted, if at any time a user from the "Senders available at the end of my workday" or the "Senders that will not be available after my workday" establishes presence or availability through an IM system, emails from such users can be automatically moved within the "Senders that are available" heading so long as John Doe is also available at that time. This categorization of emails from senders instantly provides the user John Doe with a suggested follow up order that enables prioritization of follow-up activities with senders of the listed emails.

FIG. 3 is a second pictorial view of the inbox of the email client in accordance with another embodiment of the present invention. In this example, again, the email client for John Doe is located in a city on EST. For purposes of illustration, it can be assumed that the local time for John Doe is 9:00 a.m. on Aug. 20, 2008.

The emails from different senders are sorted with greater particularity according to the location of each respective sender. Emails from senders located within the U.S.A. are organized and displayed beneath headers corresponding to different time zones within the U.S.A., e.g., "US Eastern," "US Mountain," "US Pacific." Emails from senders outside the U.S.A. are organized and displayed beneath headings that are country specific. For example, sender Steve Sierra is located in the United Kingdom while sender Jason Rodgers is located in China. The email from Steve Sierra is listed beneath the "UK" heading. The email from Jason Rodgers is listed beneath the "China" heading.

In this example, given the local time where John Doe is located, Steve Sierra is considered to be available. That is, the availability time range of Steve Sierra, being located in the UK, overlaps the current local time for John Doe. That is, after translating the current local time where John Doe is located using the time differential to the time in the UK, the translated time falls within the availability time range of Steve Sierra. Accordingly, the category "UK" and any emails beneath that heading can be moved to the top of the inbox.

By the same token, when the local time of John Doe is translated into the local time in China where sender Jason Rodgers is located, that time falls outside of the availability time range of Jason Rodgers. Accordingly, the category "China" and the emails beneath that heading can be moved to the bottom of the inbox to indicate that those senders are not currently available.

In this regard, the inbox, when traversed from top to bottom, can present a continuum of availability starting from currently available at the top and continuing down to unavailable at the bottom.

FIG. 4 is a third pictorial view of the inbox of the email client in accordance with another embodiment of the present invention. FIG. 5 reflects the state of the inbox as illustrated in FIG. 4, albeit later in the same day. As can be seen, the category "UK" has been moved to the bottom of the inbox as the workers in the UK are no longer available. That is, the local time where user John Doe is located translates into a time in the UK that is after business hours, or after the hours specified as an availability time range for sender Steve Sierra. The category "China," however, is moving up the continuum.

Figure 6:
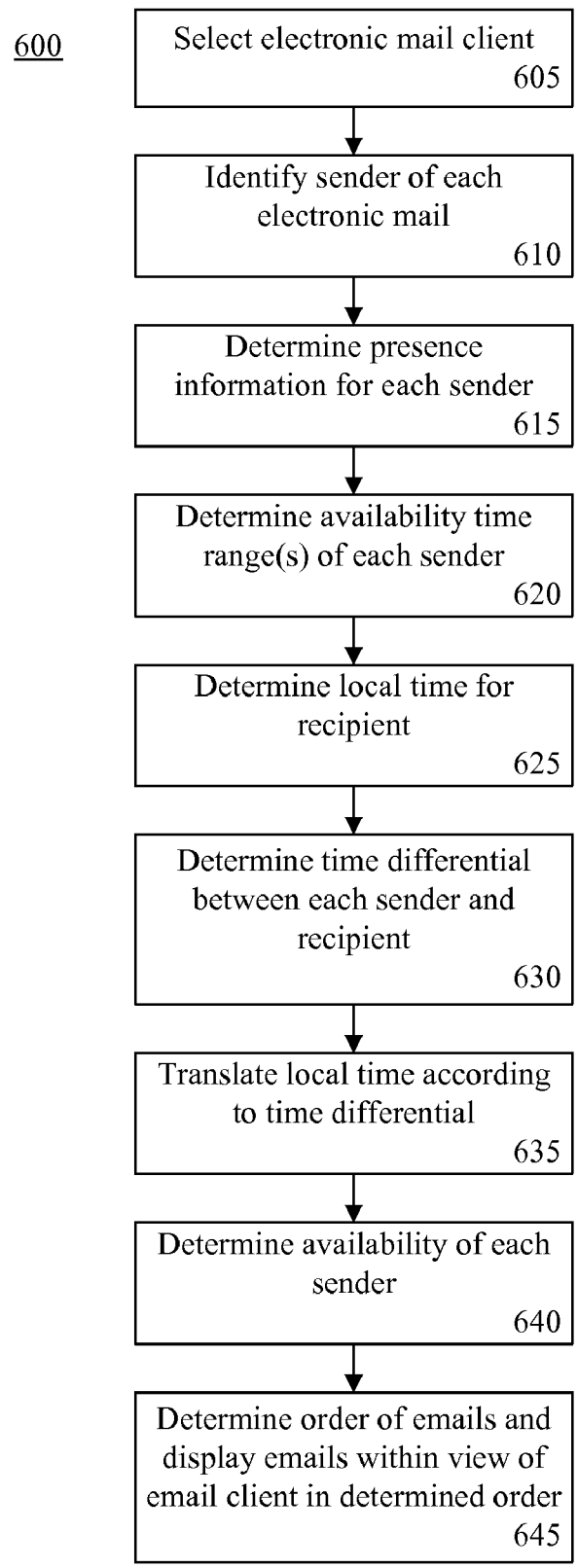
FIG. 6 is a flow chart illustrating a method of prioritizing emails within an email client in accordance with another embodiment of the present invention.

FIG. 5 is a fourth pictorial view of the inbox of the messaging client in accordance with another embodiment of the present invention. FIG. 6 illustrates the state of the inbox for John Doe when one or more users, e.g., senders, are working after hours. That is, such users are working at times that fall outside of the availability time ranges specified for those users. In this case, when the local time for user John Doe is translated into the local time for both Jane Smith and Janet Brooks, that local time falls outside of the availability time range for each respective user. Here, however, both Jane Smith and Janet Brooks are working after hours as determined by detecting presence, or availability, from an IM server. Both Jane Smith and Janet Brooks are logged into an IM server and are thus determined to be available. Accordingly, the messages from the two senders are listed atop of the inbox beneath a special category indicating that senders of messages listed therein are working after hours, or outside of availability times specified for those users.

FIGS. 2-5 illustrate various embodiments for sorting emails in a manner that effectively prioritizes emails according to the availability of the sender. As noted, the availability of each sender is determined according to the local time of the recipient of the email, any hours of availability specified for the sender, the time differential between the local time where the recipient is located and the local time where the sender is located, and/or presence information for the sender.

In another embodiment, the view presented in the email client of a user may dynamically change over time according to the availability of each email sender. As an example, the view presented may transition from FIG. 3 to FIG. 4 automatically as time passes without any intervention on behalf of the user of the email client. The user need not invoke a different view. Rather, different emails may be placed atop of the inbox view automatically based upon the current local time, the availability time range for each sender, the time differential between the recipient and the sender, and/or presence information for each sender.

FIG. 6 is a flow chart illustrating a method 600 of prioritizing emails within an email client in accordance with another embodiment of the present invention. Method 600 can be performed by a system as described within this specification. Method 600 can begin in a state in which an email client of a recipient has received a plurality of emails from different senders. Accordingly, in step 605, the email client can select emails within the inbox of the email client. It should be appreciated that while an "inbox" is used to describe the embodiments within this specification, other categories of emails or messages can be used, e.g., emails organized into other folders, sent emails, etc.

In step 610, each sender of an email within the inbox can be determined. In step 615, presence information, if available, can be determined for each sender of an email within the inbox. In step 620, an availability time range for each sender of an email within the inbox can be determined. As noted, each sender can be associated with a time range during which that user will be available. The time range can be user specified or set by default. In step 625, the local time can be determined for the recipient. In step 630, a time differential between the local time for the recipient and the local time for each sender of an email within the inbox can be determined. In step 635, the local time for the recipient can be translated into the local time for each sender using the time differentials.

In step 640, availability, or a measure thereof, can be determined for each sender of an email within the email client. The availability of each sender can be determined according to presence on an IM system, current time of the recipient, availability time range of each sender, the time differential between the recipient and sender, and/or any combination thereof. As noted, for example, the time differential can be added to the local time of the recipient and a determination can be made as to whether that translated time falls within the availability time range of a sender. If so, that sender is available. If not, the sender is not available. The IM presence of a user may be used to override any availability determination or used independently.

As noted, senders also may be categorized according to availability as illustrated with respect to FIGS. 2-5. The categories generally reflect a continuum of availability, where gradations of availability are differentiated according to geographic location, time zone, or when a particular group of senders is likely to become available based upon the current local time of the recipient, the time differential, and the availability time ranges for the senders.

In step 645, an order for the emails can be determined according to the availability of each respective sender. The emails can be presented, e.g., output, within a view of the email client in the determined order. As used herein, "output" or "outputting" can include, but is not limited to, storing data in memory, e.g., writing to a file, writing to a user display or other output device, e.g., playing audible notifications, sending or transmitting to another system, exporting, or the like.

For example, the senders, and thus messages, can be ranked or ordered in this manner with those senders that are currently available being ranked higher than those senders that are not currently available. A sender that will be available in 3 hours can be ranked higher than a sender that will be available in 4 hours. According, the emails from the sender that will be available in 3 hours can be placed closer to the top of the inbox than emails received from the sender that will be available in 4 hours.

The embodiments described within this specification provide a mechanism for sorting, ordering, and/or prioritizing messages according to availability of the sender of the message. The user of a messaging client can view received messages sorted according to availability of each sender of the message. A user can prioritize messages by selecting those messages corresponding to available users. This allows an individual to respond to users at a time when both are available to communicate.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of sorting electronic messages, the method comprising:
   via a processor, for each of a plurality of electronic messages received in an electronic messaging client, within the electronic messaging client determining availability of a sender of each electronic message according to, at least in part, a geographic location identifier contained within an electronic mail address of each sender of the electronic messages;
   via the processor, determining an order for the electronic messages within the electronic messaging client according to availability of the sender of each electronic message;
   via the processor, displaying the electronic messages within a view of the electronic messaging client in the order;
   via the processor, automatically reordering the electronic messages over time according to changing sender availability; and
   via the processor, displaying the electronic messages within the view of the electronic messaging client in an order specified by the automatic reordering.

2. The computer-implemented method of claim 1, wherein determining availability of a sender of each electronic message further comprises, via the processor, determining a time zone for each sender.

3. The computer-implemented method of claim 1, wherein determining availability of a sender of each electronic message further comprises, via the processor, determining a location for each sender in relation to a location of a user of the electronic messaging client.

4. The computer-implemented method of claim 1, wherein determining availability of a sender of each electronic message further comprises:
   via the processor, determining an availability time range for each sender;
   via the processor, determining a time differential between the sender of each electronic message and a user of the electronic messaging client; and
   via the processor, determining whether each sender is available according to a current local time for the user of the electronic messaging client and the time differential and the availability time range for each sender.

5. The computer-implemented method of claim 1, wherein determining availability of a sender of each electronic message further comprises determining, via the processor, availability from a directory of profiles of senders.

6. The computer-implemented method of claim 1, wherein determining availability of a sender of each electronic message further comprises, via the processor, determining availability of each sender according to presence information for each sender from an instant messaging system.

7. A system for system sorting electronic messages comprising:
   a processor that executes an electronic messaging client that, for each of a plurality of electronic messages received in an electronic messaging client, within the electronic messaging client determines availability of a sender of each electronic message according to, at least in part, a geographic location identifier contained within an electronic mail address of each sender of the electronic messages, determines an order for the electronic messages within the electronic messaging client according to availability of the sender of each electronic message, and displays the electronic messages within a view of the electronic messaging client in the order;
   wherein the electronic messaging client automatically reorders the electronic messages over time according to changing sender availability and displays the electronic messages within the view of the electronic messaging client in an order specified by the automatic reordering.

8. The system of claim 7, wherein the electronic messaging client further determines availability according to a time zone for each sender.

9. The system of claim 7, wherein the electronic messaging client further determines availability according to a location for each sender in relation to a location of a user of the electronic messaging client.

10. The system of claim 7, wherein the electronic messaging client further determines availability by determining an availability time range for each sender, determining a time differential between the sender of each electronic message and a user of the electronic messaging client, and determining whether each sender is available according to a current local time for the user of the electronic messaging client and the time differential and the availability time range for each sender.

11. The system of claim 7, wherein the electronic messaging client further determines availability of a sender of each electronic message by determining availability from a directory of profiles of senders.

12. The system of claim 7, wherein the electronic messaging client further determines availability of each sender by determining availability according to presence information for each sender from an instant messaging system.

13. A computer program product comprising:
   a computer-readable device comprising computer-usable program code stored thereon that sorts electronic messages, the computer-readable device comprising:
   computer-usable program code that, for each of a plurality of electronic messages received in an electronic messaging client, determines within the electronic messaging client availability of a sender of each electronic message according to, at least in part, a geographic location identifier contained within an electronic mail address of each sender of the electronic messages;
   computer-usable program code that determines an order for the electronic messages within the electronic messaging client according to availability of the sender of each electronic message;
   computer-usable program code that displays the electronic messages within a view of the electronic messaging client in the order;
   computer-usable program code that automatically reorders the electronic messages over time according to changing sender availability; and computer-usable program code that displays the electronic messages within the view of the electronic messaging client in an order specified by the automatic reordering.

14. The computer program product of claim 13, wherein the computer-usable program code that determines availability of a sender of each electronic message further comprises:
   computer-usable program code that determines an availability time range for each sender;
   computer-usable program code that determines a time differential between the sender of each electronic message and a user of the electronic messaging client; and
   computer-usable program code that determines whether each sender is available according to a current local time for the user of the electronic messaging client and the time differential and the availability time range for each sender.

15. The computer program product of claim 13, wherein the computer-usable program code that determines availability of a sender of each electronic message further comprises computer-usable program code that determines whether each sender is available according to presence information from an instant messaging system.

16. The computer program product of claim 13, wherein the computer-usable program code that determines availability of a sender of each electronic message further comprises computer-usable program code that determines availability according to a time zone for each sender.

17. The computer program product of claim 13, wherein the computer-usable program code that determines availability of a sender of each electronic message further comprises computer-usable program code that determines availability from a directory of profiles of senders.

* * * * *